(12) United States Patent
    Takanashi

(10) Patent No.: US 12,645,134 B2
(45) Date of Patent: Jun. 2, 2026

(54) ACCESSORY, ITS CONTROL METHOD, AND STORAGE MEDIUM

(71) Applicant: CANON KABUSHIKI KAISHA, Tokyo (JP)

(72) Inventor: Hideya Takanashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 18/884,922

(22) Filed: Sep. 13, 2024

(65) Prior Publication Data

US 2025/0138402 A1     May 1, 2025

(30) Foreign Application Priority Data

Oct. 27, 2023     (JP) ................................. 2023-184408

(51) Int. Cl.
    | | |
    |---|---|
    | *H04N 23/667* | (2023.01) |
    | *G03B 17/14* | (2021.01) |
    | *G03B 17/56* | (2021.01) |
    | *H04N 23/62* | (2023.01) |
    | *H04N 23/663* | (2023.01) |
    | *H04N 23/67* | (2023.01) |

(52) U.S. Cl.
    CPC ........... *G03B 17/565* (2013.01); *G03B 17/14* (2013.01); *H04N 23/62* (2023.01); *H04N 23/667* (2023.01)

(58) Field of Classification Search
    CPC ........ G03B 17/565; G03B 17/14; G03B 9/06; H04N 23/62; H04N 23/667; H04N 23/55; H04N 23/663; H04N 23/67
    See application file for complete search history.

(56) References Cited

U.S. PATENT DOCUMENTS

| | | | |
|---|---|---|---|
| 11,659,278 B2 * | 5/2023 | Takanashi | ............. H04N 23/663 |
| 2003/0160888 A1 * | 8/2003 | Yoshikawa | .......... H04N 23/673 |
| | | | 348/357 |
| 2012/0154616 A1 * | 6/2012 | Sato | ..................... H04N 23/667 |
| | | | 348/220.1 |
| 2022/0286597 A1 * | 9/2022 | Tanaka | .................. H04N 23/673 |
| 2025/0138392 A1 * | 5/2025 | Takanashi | ................ G03B 7/20 |

FOREIGN PATENT DOCUMENTS

JP          2023047507 A       4/2023

* cited by examiner

*Primary Examiner* — Marly S Camargo
(74) *Attorney, Agent, or Firm* — Cowan, Liebowitz & Latman, P.C.

(57)          ABSTRACT

An accessory detachably attached between an interchangeable lens and an image pickup apparatus includes a processor configured to acquire first, second, and third instruction information. In response to the second instruction information, the processor has at least one of a first storage mode for storing diameter information in a memory at a first timing when the second instruction information is acquired, and a second storage mode for storing the diameter information in the memory at a second timing different from the first timing. In response to the third instruction information, the processor has at least one of a first playback mode in which the aperture unit is controlled using the diameter information at a third timing when the third instruction information is acquired, and a second playback mode in which the aperture unit is controlled using the diameter information at a fourth timing different from the third timing.

16 Claims, 13 Drawing Sheets

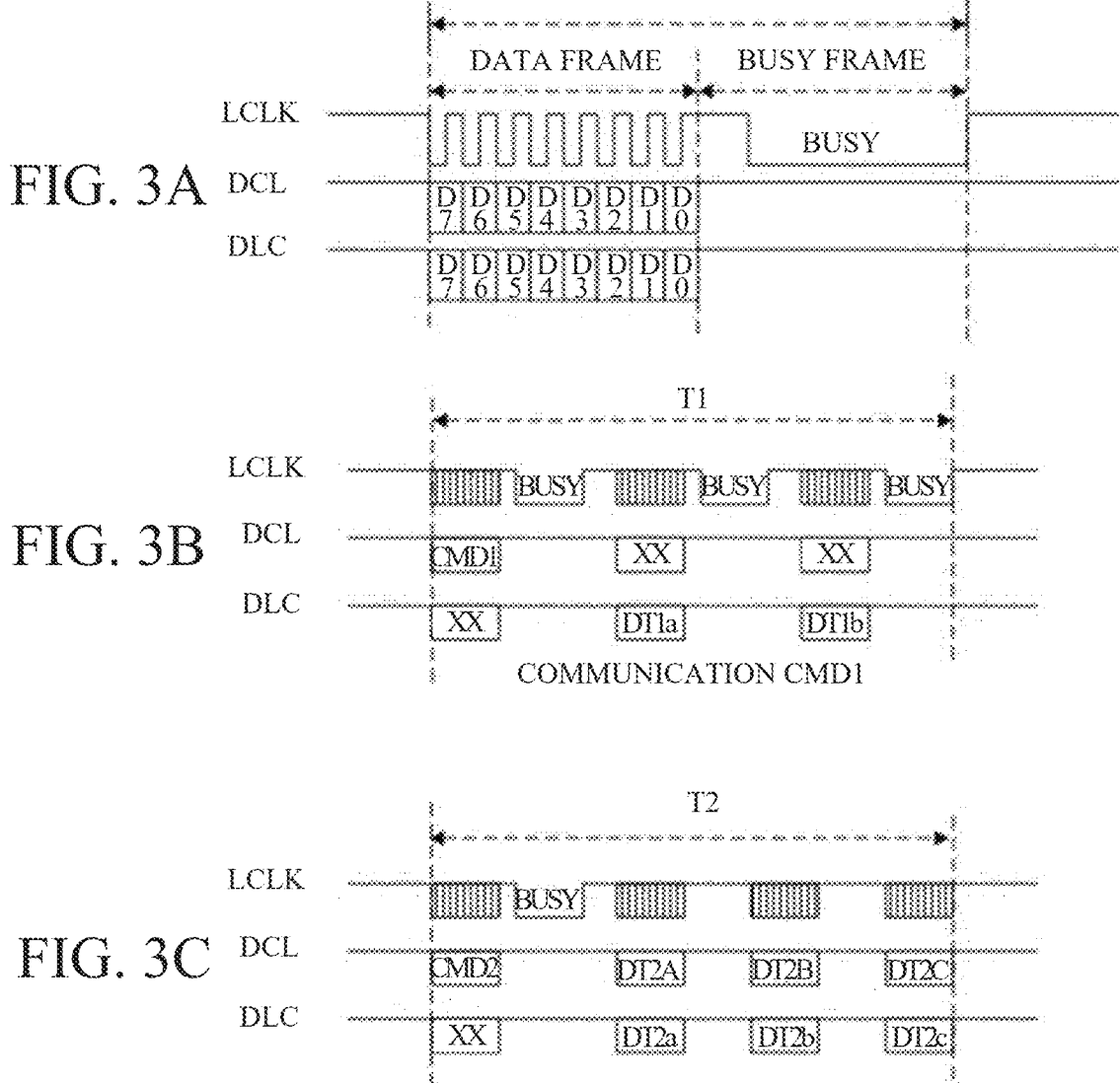

411:ELECTRONIC RING
402:LENS-SIDE COMMUNICATION TERMINAL
403:CAMERA-SIDE COMMUNICATION TERMINAL
404:APERTURE DIAMETER STORING BUTTON
405:APERTURE DIAMETER PLAYBACK BUTTON
406:OPERATION NOTIFICATION LAMP
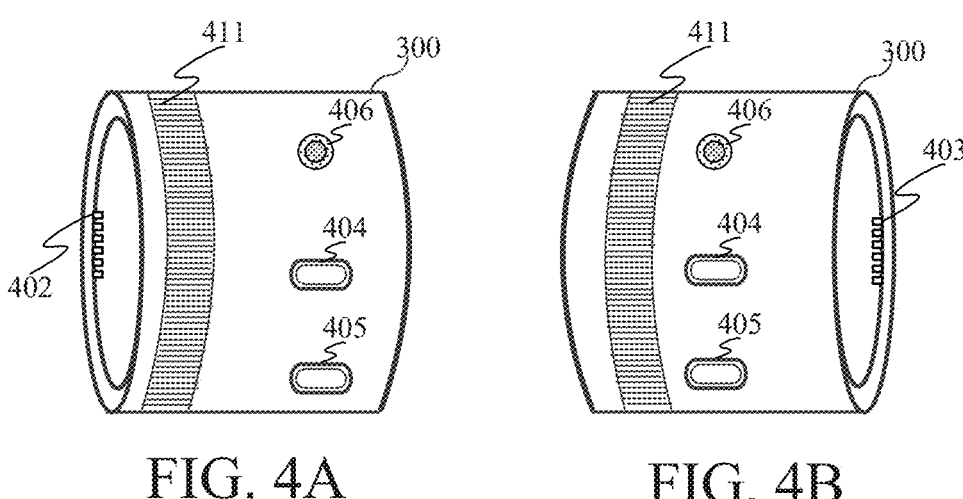
FIG. 4A                    FIG. 4B

MOVING IMAGE CAPTURING MODE
(DIAMETER INFORMATION STORAGE)

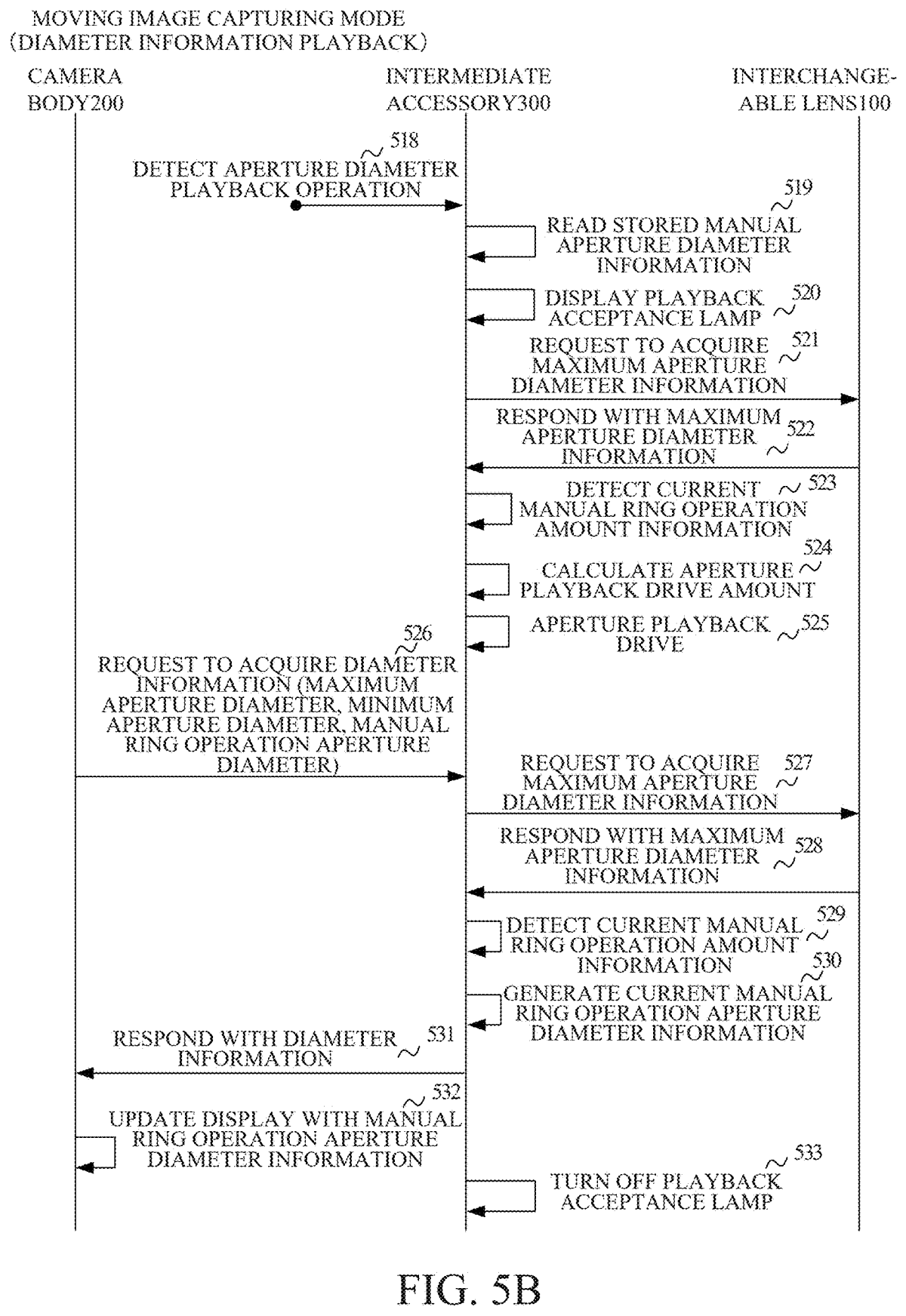

MOVING IMAGE CAPTURING MODE
(DIAMETER INFORMATION PLAYBACK)

CAMERA                          INTERMEDIATE                    INTERCHANGE-
BODY200                         ACCESSORY300                    ABLE LENS100

~518
DETECT APERTURE DIAMETER
PLAYBACK OPERATION

~519
READ STORED MANUAL
APERTURE DIAMETER
INFORMATION

DISPLAY PLAYBACK ~520
ACCEPTANCE LAMP

REQUEST TO ACQUIRE ~521
MAXIMUM APERTURE
DIAMETER INFORMATION

RESPOND WITH MAXIMUM 522
APERTURE DIAMETER
INFORMATION ~

DETECT CURRENT ~523
MANUAL RING OPERATION
AMOUNT INFORMATION

524
CALCULATE APERTURE ~
PLAYBACK DRIVE AMOUNT

APERTURE PLAYBACK ~525
DRIVE

~526
REQUEST TO ACQUIRE DIAMETER
INFORMATION (MAXIMUM
APERTURE DIAMETER, MINIMUM
APERTURE DIAMETER, MANUAL
RING OPERATION APERTURE
DIAMETER)

REQUEST TO ACQUIRE    527
MAXIMUM APERTURE  ~
DIAMETER INFORMATION

RESPOND WITH MAXIMUM 528
APERTURE DIAMETER ~
INFORMATION

DETECT CURRENT MANUAL ~529
RING OPERATION AMOUNT ~
INFORMATION    530
~
GENERATE CURRENT MANUAL
RING OPERATION APERTURE
DIAMETER INFORMATION

RESPOND WITH DIAMETER ~531
INFORMATION ~

~532
UPDATE DISPLAY WITH MANUAL
RING OPERATION APERTURE
DIAMETER INFORMATION

~533
TURN OFF PLAYBACK
ACCEPTANCE LAMP

FIG. 5B

STILL IMAGE CAPTURING MODE
(DIAMETER INFORMATION STORAGE)

STILL IMAGE CAPTURING MODE
(DIAMETER INFORMATION STORAGE)

STILL IMAGE CAPTURING MODE
(DIAMETER INFORMATION PLAYBACK)

411:ELECTRONIC RING
402:LENS-SIDE COMMUNICATION TERMINAL
403:CAMERA-SIDE COMMUNICATION TERMINAL
405:APERTURE DIAMETER PLAYBACK BUTTON
406:OPERATION NOTIFICATION LAMP

STILL IMAGE CAPTURING MODE
(DIAMETER INFORMATION STORAGE)

STILL IMAGE CAPTURING MODE
(DIAMETER INFORMATION PLAYBACK OPERATION)

STILL IMAGE CAPTURING MODE
(DIAMETER INFORMATION PLAYBACK OPERATION)

ACCESSORY, ITS CONTROL METHOD, AND STORAGE MEDIUM

BACKGROUND

Technical Field

The present disclosure relates to an accessory, its control method, and a storage medium.

Description of Related Art

In a lens interchangeable type camera system, an accessory attachable between a camera body and an interchangeable lens has conventionally been proposed to expand the functions. Japanese Patent Laid-Open No. 2023-47507 discloses an accessory attached between the interchangeable lens and the camera body, and configured to allow the user to perform storage and playback of a focus position.

The accessory disclosed in Japanese Patent Laid-Open No. 2023-47507 does not have an aperture unit (aperture stop unit or diaphragm unit). In Japanese Patent Laid-Open No. 2023-47507, the storage and playback of the focus position is performed through storage and drive controls as soon as the user operates the operation unit.

SUMMARY

An accessory according to one aspect of the disclosure is detachably attached between an interchangeable lens and an image pickup apparatus. The accessory includes an aperture unit configured to adjust a light amount incident from the interchangeable lens, a communication unit configured to communicate with each of the interchangeable lens and the image pickup apparatus, a memory storing diameter information of the aperture unit, and a processor configured to control the aperture unit using the diameter information, and acquire, through an operation by a user, first instruction information for instructing control of the aperture unit, second instruction information for instructing storage of the diameter information, and third instruction information for instructing playback of the diameter information. The processor has at least one of a first storage mode for storing the diameter information in the memory at a first timing when the second instruction information is acquired in a case where the processor acquires the second instruction information, and a second storage mode for storing the diameter information in the memory at a second timing different from the first timing in a case where the processor acquires the second instruction information. The processor has at least one of a first playback mode in which the aperture unit is controlled using the diameter information at a third timing when the third instruction information is acquired in a case where the processor acquires the third instruction information, and a second playback mode in which the aperture unit is controlled using the diameter information at a fourth timing different from the third timing in a case where the processor acquires the third instruction information. A control method of the above accessory and a storage medium storing a program that causes a computer to execute the above control method also constitutes another aspect of the disclosure.

Further features of various embodiments of the disclosure will become apparent from the following description of embodiments with reference to the attached drawings.

BRIEF DESCRIPTION OF THE DRAWINGS

FIGS. 3A, 3B, and 3C explain an example of a communication protocol implemented among the camera body, intermediate accessory, and interchangeable lens in each embodiment.

FIGS. 4A and 4B are external views of the intermediate accessory according to the first embodiment.

FIG. 5B explains a playback operation of the aperture diameter in the moving image capturing mode according to the first embodiment.

DETAILED DESCRIPTION

Figure 1:
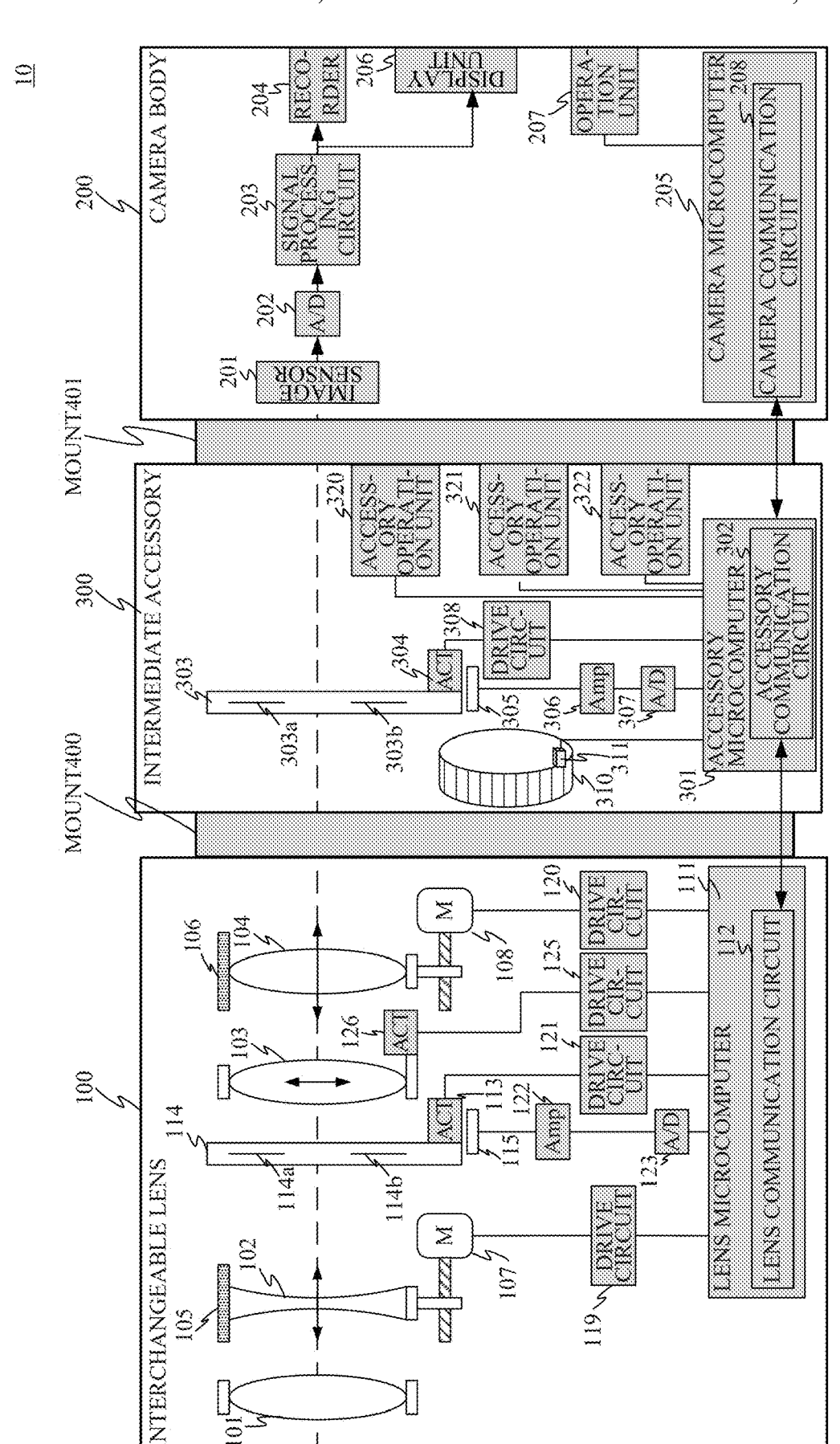
FIG. 1 is a block diagram of an imaging system according to each embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

Configuration of Camera System

Referring now to FIG. 1, a description will be given of a camera system (imaging system) 10 according to a first embodiment of the present disclosure. FIG. 1 is a block diagram of the camera system 10. The camera system 10 includes an interchangeable lens 100, a camera body (image pickup apparatus) 200, and an intermediate accessory (accessory) 300 detachably mounted between the camera body 200 and the interchangeable lens 100. The camera body 200 can be used while the interchangeable lens 100 and the intermediate accessory 300 are attached to each other. In this embodiment, the intermediate accessory 300 includes a single accessory, but may include a plurality of accessories.

In this embodiment, communication is performed among the interchangeable lens 100, the camera body 200, and the intermediate accessory 300. The interchangeable lens 100, the camera body 200, and the intermediate accessory 300 transmit a control command and data (information) via their respective lens communication circuits (communication units) 112, 208, and 302.

A description will now be given of the specific configurations of the interchangeable lens 100, the camera body 200, and the intermediate accessory 300. The interchangeable lens 100 and the intermediate accessory 300 are mechanically and electrically connected via a mount 400. The mount 400 is illustrated as a schematic representation of a state in which a mount provided on the interchangeable lens 100 and a mount provided on the intermediate accessory 300 are joined together. The camera body 200 and the intermediate accessory 300 are mechanically and electrically connected via a mount 401. The mount 401 is illustrated as a schematic representation of a state in which a mount provided on the camera body 200 and a mount provided on the intermediate accessory 300 are joined together. A communication terminal is provided on the mount surface of each of the mounts provided on the interchangeable lens 100, the camera body 200, and the intermediate accessory 300. In a case where each unit is connected via the mounts, the corresponding communication terminals come into contact with each other, and communications are activated via the communication terminals.

The interchangeable lens 100 receives power from the camera body 200 via unillustrated power terminals provided on the mounts 400 and 401, and supplies power to various actuators, which will be described later, and a lens microcomputer (lens microcomputer) 111. The intermediate accessory 300 receives power from the camera body 200 via an unillustrated power terminal provided on the mount 401, and supplies power to an accessory microcomputer (control unit (accessory microcomputer)) 301.

A description will now be given of the configuration of the interchangeable lens 100. The interchangeable lens 100 includes an imaging optical system. The imaging optical system includes, in order from the object side to the image side, a field lens 101, a zoom lens 102 configured to provide magnification variation, an aperture unit 114 configured to adjust a light amount, an image stabilizing lens 103, and a focus lens 104 configured to provide focusing.

The zoom lens 102 and focus lens 104 are held by lens holding frames 105 and 106, respectively. Stepping motors 107 and 108 drive the lens holding frames 105 and 106 along the optical axis of the imaging optical system, which is indicated by a dashed line, in synchronization with a drive pulse. The image stabilizing lens 103 reduces image blur caused by camera shake (handheld shake) or the like by moving in a direction that has a component perpendicular to the optical axis of the imaging optical system.

The lens microcomputer 111 controls the operation of each part in the interchangeable lens 100. The lens microcomputer 111 receives a control command and a transmission request command transmitted from the camera body 200 or the intermediate accessory 300 via the lens communication circuit 112. The lens microcomputer 111 performs lens control corresponding to the control command, and transmits lens data corresponding to the transmission request command to the camera body 200 or the intermediate accessory 300 via the lens communication circuit 112. For example, the lens microcomputer 111 drives the stepping motors 107 and 108 by outputting drive signals to the zoom drive circuit 119 and the focus drive circuit 120 in response to a command relating to the magnification variation and focusing among the control commands. Thereby, zoom processing to control the magnification varying operation by the zoom lens 102 and autofocus (AF) processing to control the focusing operation by the focus lens 104 can be performed.

The aperture unit 114 is an aperture stop unit having aperture blades 114a and 114b. A Hall element 115 detects the states (positions) of the aperture blades 114a and 114b. The detection result by the Hall element 115 is input to the lens microcomputer 111 via an amplifier circuit 122 and an A/D conversion circuit 123. The lens microcomputer 111 outputs a drive signal to an aperture drive circuit 121 based on the input signal from the A/D conversion circuit 123 to drive an aperture actuator 113. Thereby, the light amount operation by the aperture unit 114 is performed. The drive method of the aperture actuator 113 is not limited and any known method may be used.

The lens microcomputer 111 drives an image stabilizing actuator 126 such as a voice coil motor via an image stabilizing drive circuit 125 according to shakes detected by an unillustrated vibration sensor such as a vibration gyroscope provided in the interchangeable lens 100. Thereby, image stabilizing processing for controlling a shift operation (image stabilizing operation) of the image stabilizing lens 103 is performed.

A description will now be given of the configuration of the intermediate accessory 300. The intermediate accessory 300 includes an accessory microcomputer 301, which controls various members included in the intermediate accessory. The accessory microcomputer 301 receives a control command and a transmission request command transmitted from the camera body 200 via an accessory communication circuit 302. The accessory microcomputer 301 performs accessory control in response to the control command, or transmits a control command to the interchangeable lens 100 via the accessory communication circuit 302. Then, as a result of performing the accessory control, or based on information received from the interchangeable lens 100 via the accessory communication circuit 302, a response corresponding to the transmission request command received from the camera body 200 is transmitted to the camera body 200. The accessory microcomputer 301 does not necessarily transmit a transmission request command to the interchangeable lens 100 via the accessory communication circuit 302 only in response to a communication request from the camera body 200. For example, in a case where an accessory operation ring (operation member) 310 (described later) or the like is operated, a communication request is transmitted to the interchangeable lens 100 via the accessory communication circuit 302, as necessary.

The intermediate accessory 300 further includes a manual aperture operation ring (so-called electronic ring) 310 that can be rotated by the user, and a ring rotation detector 311. The ring rotation detector 311 includes, for example, a photo-interrupter that outputs a two-phase signal in response to the rotation of the manual aperture operation ring 310. The accessory microcomputer 301 can detect a rotation amount (including a direction) of the manual aperture operation ring 310 using the two-phase signal.

The intermediate accessory 300 further includes an accessory operation unit 320 other than the manual aperture operation ring 310, and an accessory memory 321. The accessory operation unit 320 includes, for example, a switch, a button, a touch panel, or the like, and may include a plurality of operation members.

The accessory memory 321 is, for example, a nonvolatile memory. In this embodiment, as described later, the diameter information of the accessory aperture unit (aperture unit) 303 is stored. The diameter information stored in the accessory memory 321 can be played back at a predetermined timing. The diameter information may include information on an aperture drive amount of the accessory aperture unit 303. The diameter information may also include diameter information when the interchangeable lens 100 is open.

In this embodiment, the accessory microcomputer 301 can accept an aperture diameter (diameter information) storing operation or an aperture diameter playback operation from the user at the accessory operation unit 320, and stores the diameter information in the accessory memory 321 through a storing operation by the user. Since the accessory memory 321 is a nonvolatile memory, the storing state is maintained even if the camera body 200 is powered off. The storing operation or playback operation of the aperture diameter from the user may be realized by communication with the camera body 200 or the interchangeable lens 100 without providing an operating member as described above. The intermediate accessory 300 also has an accessory notification unit 322 for notifying the user of information. The notification member of the accessory notification unit 322 may include, for example, a light emitting diode (LED), a liquid crystal display (LCD), a speaker, a vibrator, etc. The accessory notification unit 322 may have a plurality of notification members. As described later, in this embodiment, the accessory notification unit 322 is used to notify the user of the storage state and playback state of the diameter information.

The intermediate accessory 300 further includes an accessory aperture unit (aperture unit) 303 configured to adjust a light amount incident from the interchangeable lens 100. The accessory aperture unit 303 is an aperture stop unit having aperture blades 303*a* and 303*b*. A Hall element 305 detects the state (position) of the aperture blades 303*a* and 303*b*. The detection result by the Hall element 305 is input to the accessory microcomputer 301 via an amplifier circuit 306 and an A/D conversion circuit 307. The accessory microcomputer 301 outputs a drive signal to an aperture drive circuit 308 based on an input signal from the A/D conversion circuit 307 to drive the aperture actuator 304. Thereby, the light amount adjustment by the accessory aperture unit 303 is performed. The drive method of the aperture actuator 304 is not limited, and any known method may be used. This embodiment controls the accessory aperture unit 303 to operate in conjunction with a user operation of a manual aperture operation ring 310, but the intermediate accessory 300 does not necessarily have to include the manual aperture operation ring 310. For example, manual aperture operation information may be transmitted from the camera body 200 or the interchangeable lens 100 via the accessory communication circuit 302.

The intermediate accessory 300 may have, for example, a function of an extender configured to change a focal length, a wide converter configured to change a focal length, or a mount converter configured to change a flange back length.

A description will now be given of the configuration of the camera body 200. The camera body 200 includes an image sensor 201 such as a CCD sensor or CMOS sensor, an A/D conversion circuit 202, a signal processing circuit 203, a recorder 204, a camera microcomputer (camera microcomputer) 205, and a display unit 206.

The image sensor 201 performs photoelectric conversion for an object image formed by the imaging optical system in the interchangeable lens 100 and outputs an electrical signal (analog signal). The A/D conversion circuit 202 converts the analog signal from the image sensor 201 into a digital signal. The signal processing circuit 203 performs various image processing for the digital signal from the A/D conversion circuit 202 to generate a video signal.

The signal processing circuit 203 also generates from the video signal a contrast state of an object image, that is, focus information on a focus state of the imaging optical system, and luminance information on an exposure state. The signal processing circuit 203 outputs the video signal to the display unit 206, which displays the video signal as a live-view image that is used to check the composition, focus state, etc.

The camera microcomputer 205 controls the camera body 200 according to input from an operation unit 207, such as an image capture instruction switch and various setting switches. The camera microcomputer 205 transmits a control command and a transmission request command to the interchangeable lens 100 or intermediate accessory 300 via the camera communication circuit 208, and receives lens data or accessory data from the interchangeable lens 100 or intermediate accessory 300. For example, the camera microcomputer 205 generates focus shift information in the signal processing circuit 203 based on information regarding an optical characteristic, such as aperture diameter information, received from the interchangeable lens 100 or intermediate accessory 300 via the camera communication circuit 208. Then, based on the generated focus shift information, it generates focus information and transmits a control command relating to focusing operation to the interchangeable lens 100. For example, the camera microcomputer 205 transmits a transmission request command to the interchangeable lens 100 to obtain lens data relating to a focusing operation, and receives lens data relating to a focusing operation from the interchangeable lens 100.

Figure 2:
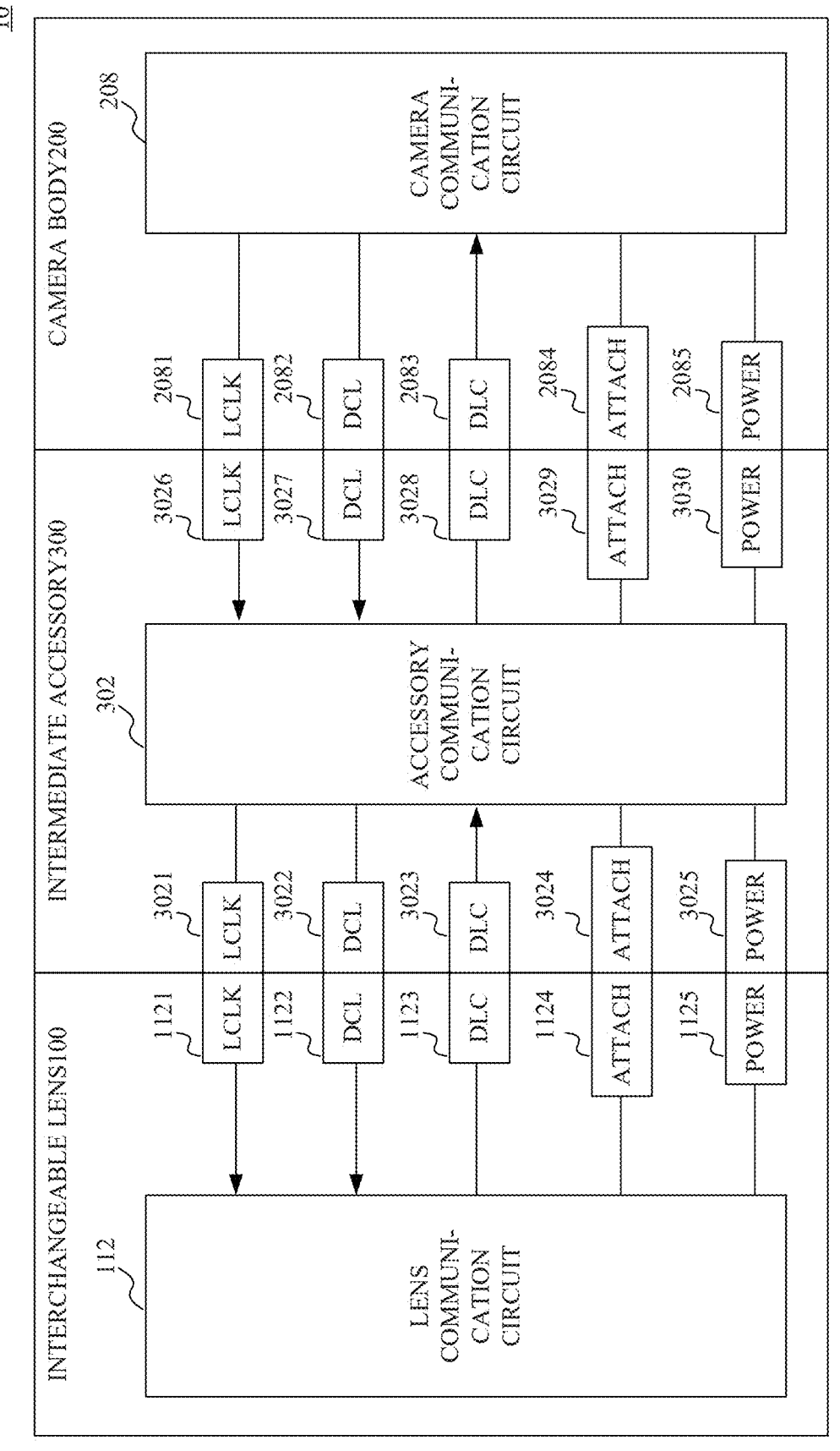
FIG. 2 explains each communication unit in a camera body, an intermediate accessory, and an interchangeable lens in each embodiment.

Referring now to FIG. 2, a description will be given of the communication units of the camera body 200, intermediate accessory 300, and interchangeable lens 100. FIG. 2 explains the lens communication circuit 112, accessory communication circuit 302, and camera communication circuit 208.

The mount 400 provided between the interchangeable lens 100 and intermediate accessory 300 has various communication terminals. The interchangeable lens 100 has communication terminals (LCLK 1121, DCL 1122, DLC 1123, ATTACH 1124, POWER 1125). The intermediate accessory 300 has communication terminals (LCLK 3021, DCL 3022, DLC 3023, ATTACH 3024, POWER 3025). The intermediate accessory 300 can determine the attachment state of the interchangeable lens 100 by the ATTACH signal 3024, and supplies power through POWER 3025. Communication is available using other communication terminals.

Similarly, various communication terminals are provided on the mount 401 that is disposed between the intermediate accessory 300 and the camera body 200. The intermediate accessory 300 has communication terminals (LCLK 3026, DCL 3027, DLC 3028, ATTACH 3029, POWER 3030). The camera body 200 has communication terminals (LCLK 2081, DCL 2082, DLC 2083, ATTACH 2084, POWER 2085). The camera body 200 can determine the attachment state of the intermediate accessory 300 by the ATTACH signal 2084, and supplies power through POWER 2085. Communication is available using other communication terminals. The ATTACH signal 2084 is configured to be in a signal state of an attached state while the interchangeable lens 100 is attached to the intermediate accessory 300 (the ATTACH signal 3024 indicates the attached state) and the intermediate accessory 300 is attached to the camera body 200.

Referring now to FIGS. 3A, 3B, and 3C, a description will be given of an example of a communication method performed using each terminal between the interchangeable lens 100 and the intermediate accessory 300, and between the intermediate accessory 300 and the camera body 200. FIGS. 3A, 3B, and 3C explain an example of a protocol for communication performed among the camera body 200, the intermediate accessory 300, and the interchangeable lens 100.

This communication is performed using a three-wire clock synchronous serial communication method, and is a communication method performed between a device acting as a main communication component that transmits a control command and a data transmission request command, and a device acting as a sub communication component that transmits data in response to a data transmission request command. In the communication processing performed between the camera body 200 and the intermediate accessory 300, the camera communication circuit 208 serves as a main communication component and the accessory communication circuit 302 serves as a sub communication component. In the communication processing performed between the intermediate accessory 300 and the interchangeable lens 100, the accessory communication circuit 302 serves as a main communication component and the lens communication circuit 112 serves as a sub communication component.

The clock signal LCLK is mainly used as a data synchronization clock signal from the main communication component to the sub communication component. The communication signal DCL is used to transmit data such as a control command and a data transmission request command from the main communication component to the sub communication component. The data signal DLC is used to transmit data from the sub communication component to the main communication component.

The main communication component and the sub communication component communicate using a full duplex communication method in which they transmit and receive data to and from each other and simultaneously in synchronization with the common clock signal LCLK.

FIG. 3A illustrates a waveform of a communication signal for one frame, which is the minimum communication unit. First, the main communication component transmits the clock signal LCLK, which has a set of eight-cycle pulses, and also transmits the communication signal DCL to the sub communication component in synchronization with the clock signal LCLK. At the same time, the main communication component receives a data signal DLC output from the sub communication component in synchronization with the clock signal LCLK. In this way, one-byte (8-bit) data is transmitted and received between the main communication component and the sub communication component in synchronization with a pair of clock signals LCLK. A period during which one-byte data is transmitted and received will be referred to as a data frame. After the data frame, a communication pause period is inserted by communication standby request information (simply referred to as a communication standby request hereinafter) BUSY notified from the sub communication component to the main communication component. The communication pause period will be referred to as a BUSY frame. A communication unit consisting of a set of a data frame and a BUSY frame will be referred to as one frame.

FIG. 3B illustrates a waveform of a communication signal consisting of three frames, in which the main communication component transmits a command CMD1 to the sub communication component and receives two-byte data DT1a and DT1b in response to it. Between the main communication component and sub communication component, the type and number of bytes of data DT corresponding to each command CMD are previously determined.

In the first frame, the main communication component transmits the clock signal LCLK, and transmits the command CMD1 corresponding to the data DT1a and DT1b for requesting transmission, as a communication signal DCL. The data signal DLC in this frame is treated as invalid data.

Next, the main communication component outputs the clock signal LCLK for eight cycles, and then switches the communication terminal state on the main communication component side from an output format to an input format. After the sub communication component has completed switching of the communication terminal state on the main communication component side, it switches the communication terminal state on the sub communication component side from the input format to the output format. The sub communication component then sets the signal level of the clock signal LCLK to a low level (LOW) in order to notify the main communication component of the communication standby request BUSY. The main communication component maintains the communication terminal state in the input format while the communication standby request BUSY is being notified, and suspends communication to the sub communication component.

The sub communication component generates the data DT1a corresponding to the command CMD1 during the notification period of the communication standby request BUSY. After the transmission preparation of the next frame of the data signal DLC is completed, the sub communication component sets the signal level of the clock signal LCLK to a high level (HIGH) to notify the main communication component that the communication standby request BUSY has been cleared. In a case where the main communication component recognizes that the communication standby request BUSY has been cleared, it receives data DT1a from the sub communication component by sending a one-frame clock signal LCLK to the sub communication component. Next, the main communication component similarly receives the data DT1b.

FIG. 3C illustrates that the main communication component transmits the command CMD2 to the sub communication component to request to acquire communication data, and DT2A, DT2B, and DT2C are transmitted from the camera body 200 to the interchangeable lens 100. Then, the interchangeable lens 100 transmits the corresponding 3-byte lens data DT2a, DT2b, and DT2c to the camera body 200, and a waveform of a 4-frame communication signal is illustrated. In the first frame, the sub communication component notifies the main communication component of the communication standby request BUSY, but in the second to fourth frames, it does not notify the main communication component of the communication standby request BUSY. Therefore, an interval between frames can be reduced. On the other hand, in this communication method, the sub communication component cannot notify the main communication component of the communication standby request BUSY. Therefore, it is necessary to create information to respond to the main communication component during the communication standby request BUSY after the command CMD2 received in the first frame, or to prepare information to respond to the main communication component before this communication is performed.

Referring now to FIGS. 4A and 4B, a description will be given of the external appearance of the intermediate accessory 300 according to this embodiment. FIGS. 4A and 4B are external views of the intermediate accessory 300. FIG. 4A illustrates the inside of the mount on the interchangeable lens 100 side, and FIG. 4B illustrates the inside of the mount on the camera body 200 side.

The electronic ring 411 is a first operation member that can be operated by the user, and corresponds to the manual aperture operation ring 310. The electronic ring 411 outputs first instruction information for instructing the control (of the operation and target position) of the accessory aperture unit 303 through the user operation. A lens-side communication terminal 402 corresponds to reference numerals 3021 to 3025 in FIG. 2. A camera-side communication terminal 403 corresponds to reference numerals 3026 to 3030 in FIG. 2. An aperture diameter storing button 404 is a second operation member that can be operated by the user. The aperture diameter storing button 404 outputs second instruction information for instructing the storage of diameter information through the user operation. An aperture diameter playback button 405 is a third operation member that can be operated by the user. The aperture diameter playback button 405 outputs third instruction information for instructing the playback of the diameter information by the user operation. The aperture diameter storing button 404 and the aperture diameter playback button 405 are included in the accessory operation unit 320. An operation notification lamp 406 is included in the accessory notification unit 322 and is used to notify the user that the user has performed the storage and playback operation of the aperture diameter (diameter information).

Figure 5A:
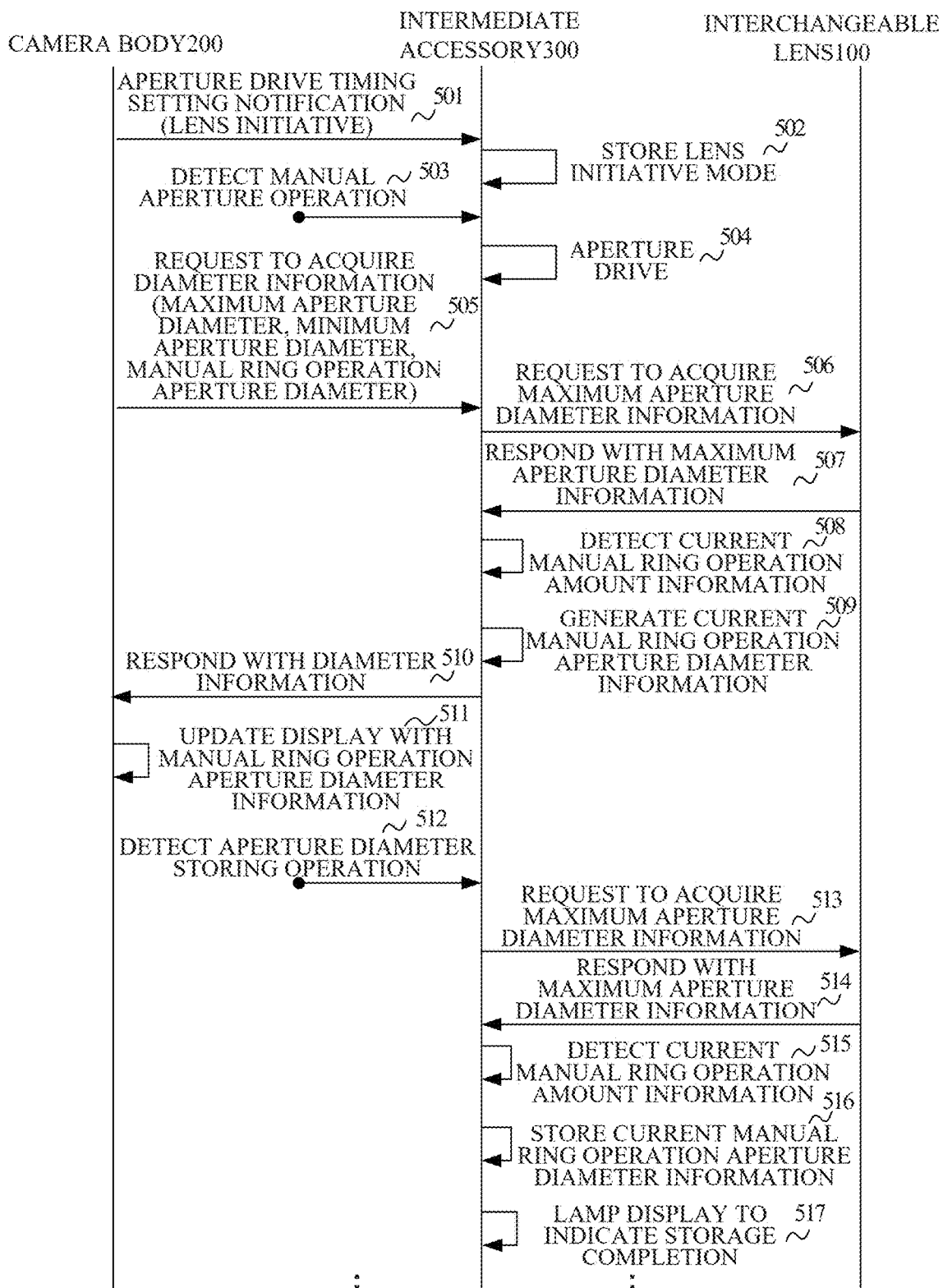
FIG. 5A explains a storing operation of an aperture diameter in a moving image capturing mode according to the first embodiment.
Figure 5C:
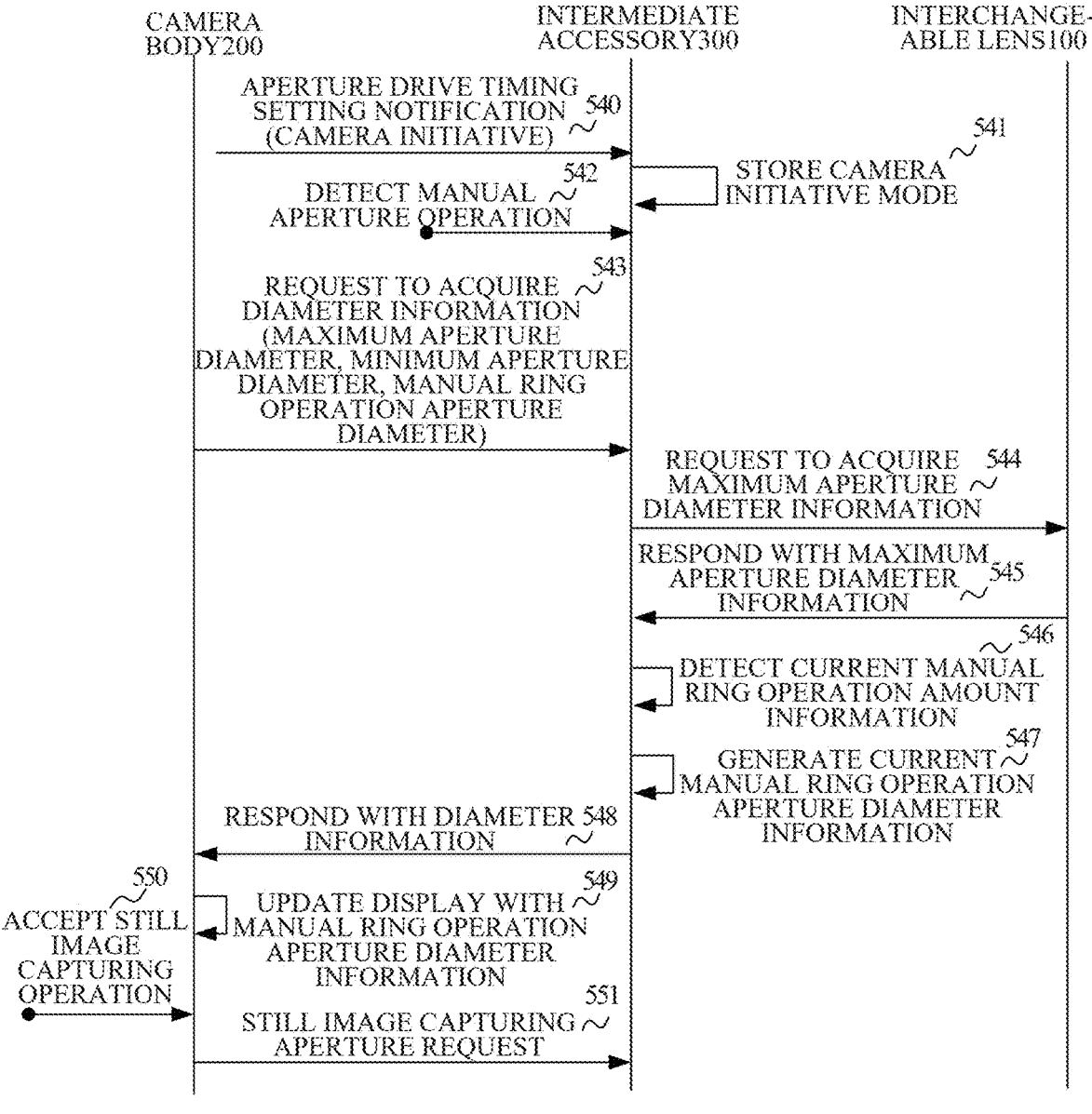
FIGS. 5C and 5D explain a storing operation of the aperture diameter in a still image capturing mode according to the first embodiment.
Figure 5D:
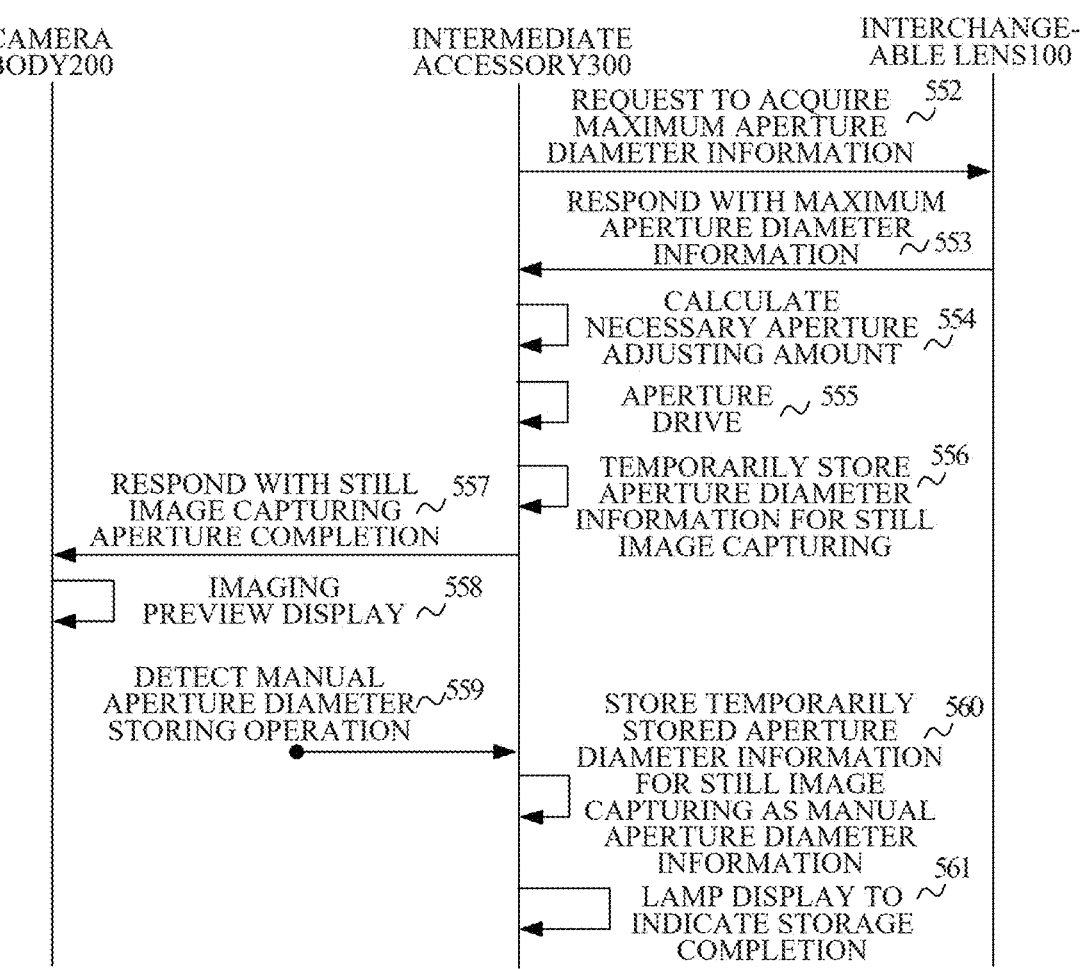
Figure 5E:
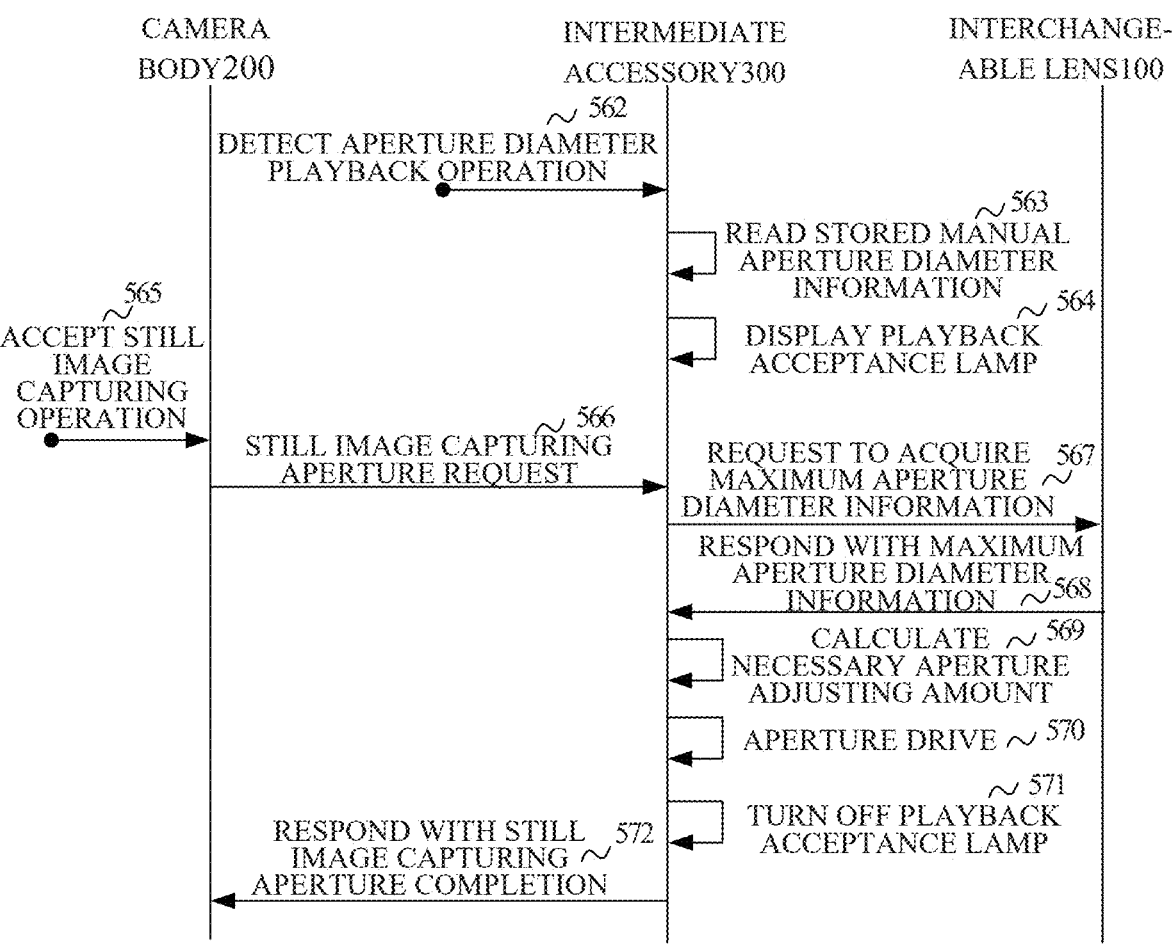
FIG. 5E explains a playback operation of the aperture diameter in the still image capturing mode according to the first embodiment.

Referring now to FIGS. 5A, 5B, 5C, and 5D, a description will be given of the storing operation and playback operation of the aperture diameter (aperture information) in the state in which the camera body 200, the interchangeable lens 100, and the intermediate accessory 300 are combined. FIG. 5A explains the storing operation of the aperture diameter in the moving image capturing mode. FIG. 5B explains the playback operation of the aperture diameter in the moving image capturing mode. FIGS. 5C and 5D explain the storing operation of the aperture diameter in the still image capturing mode. FIG. 5E explains the playback operation of the aperture diameter in the still image capturing mode.

Example of Moving Image Capturing Mode

In processing 501, the camera body 200 notifies the intermediate accessory 300 of setting information regarding the aperture drive timing. This embodiment assumes two types of notifications as this communication: "lens initiative" and "camera initiative." The "lens initiative" setting is a method that drives the aperture unit as soon as the user performs the aperture operation. On the other hand, the "camera initiative" setting is a method that switches the display when the user performs the aperture setting, but does not drive the aperture unit immediately. For example, in the still image capturing mode, the aperture diameter is set to be brighter than a predetermined aperture diameter in the live-view display state from the viewpoint of AF accuracy, and the "camera initiative" is set in the aperture narrowing (adjusting) control to the aperture diameter set during still image capturing. In processing 502, the intermediate accessory 300 stores this setting information.

In processing 503, the accessory microcomputer 301 detects that the electronic ring (manual aperture ring) 411 illustrated in FIGS. 4A and 4B has been operated (first instruction information). In this embodiment, the intermediate accessory 300 includes the electronic ring 411, but the manual aperture operation information may be communicated from the camera body 200 or the interchangeable lens 100. In processing 504, the accessory microcomputer 301 drives the accessory aperture unit 303 in accordance with the ring operation amount detected in processing 503 (aperture drive).

Thereafter, at an arbitrary timing, a request to acquire aperture diameter information is transmitted from the camera body 200 in processing 505. In this processing, the diameter information requested by the camera body 200 includes, for example, a maximum aperture diameter, a minimum aperture diameter, and a manual ring operation aperture diameter. The maximum aperture diameter refers to diameter information when the aperture is fully open. The minimum aperture diameter refers to diameter information when the aperture is most narrowed. The manual ring operation aperture diameter refers to diameter information in a case where the manual ring is operated.

The maximum aperture diameter has different specifications depending on the model of the attached interchangeable lens 100, and in the case of a zoom lens, it also changes depending on the zoom position. Therefore, the intermediate accessory 300 requests the interchangeable lens 100 to acquire maximum aperture diameter information in processing 506.

The intermediate accessory 300 generates current manual ring operation diameter information in processing 509 using maximum aperture diameter information acquired from the interchangeable lens 100 in processing 507, and a current aperture adjusting amount of the accessory aperture unit 303 acquired in processing 508. The minimum aperture diameter information can be calculated from the maximum aperture diameter information and the aperture adjustable amount by which the accessory aperture unit 303 can be mechanically adjusted.

In processing 510, the intermediate accessory 300 responds to the camera body 200 with the diameter information generated in processing 506 to processing 509. In processing 511, the current diameter information is displayed on the display unit 206 of the camera body 200. In processing 512, the accessory microcomputer 301 detects that the aperture diameter storing button 404 illustrated in FIGS. 4A and 4B has been operated (second instruction information). Processing 513 to processing 515 acquire the maximum aperture diameter information of the interchangeable lens 100 and operation amount information on the manual aperture ring, similarly to processing 506 to processing 508.

In processing 516, the accessory microcomputer 301 generates current manual ring operation aperture diameter information from the maximum aperture diameter information of the interchangeable lens 100 and the operation amount information of the manual aperture ring, and stores that aperture diameter information in the accessory memory 321. For example, in processing 514, information on the maximum aperture diameter of F8.0 is received from the interchangeable lens 100. Then, in processing 515, in a case where the aperture adjusting amount of the accessory aperture unit 303 is 0.5 steps, F9.5 (8.0+(11−8)×0.5) is stored as the current aperture diameter. Alternatively, in a case where the aperture adjusting amount is 0.125 steps, F8.375 (8.0+(11−8)×0.125) is stored as the current aperture diameter.

In processing 517, the operation notification lamp 406 illustrated in FIGS. 4A and 4B is turned on for a predetermined time to indicate that a storing operation has been performed in response to a user request to store the aperture diameter.

Using the above processing, storage of the aperture diameter information by user operation is completed. Thereafter, the aperture diameter may be changed by the user operation, and the stored aperture diameter is played back by performing the aperture diameter playback operation described in FIG. 5B below.

In processing 518, the accessory microcomputer 301 detects that the aperture diameter playback button 405 illustrated in FIGS. 4A and 4B has been operated (third operation information). In processing 519, the accessory microcomputer 301 reads and acquires the aperture diameter information stored in processing 516 from the accessory memory 321. Only one piece of aperture diameter information may be stored, or a plurality of pieces may be stored and one of them may be readable. In processing 520, the operation notification lamp 406 illustrated in FIGS. 4A and 4B is turned on. In processing 521 to processing 523, the accessory microcomputer 301 generates current aperture diameter information by acquiring maximum aperture diameter information of the interchangeable lens 100 and operation amount information of the accessory aperture unit 303, similarly to processing 506 to processing 508.

In processing 524, the accessory microcomputer 301 calculates an aperture control amount using a difference between the stored aperture diameter information read out in processing 519 and the current aperture diameter information generated in processing 523. In processing 525, the accessory microcomputer 301 drives the accessory aperture unit 303 using the aperture control amount (aperture playback drive). For example, in a case where the maximum aperture diameter acquired from the interchangeable lens 100 in processing 522 is F5.6 and the aperture amount of the accessory aperture unit 303 acquired in processing 523 is 0.5 steps, the current aperture diameter is F6.8 (5.6+(8−5.6)× 0.5). In a case where the stored F-number read out in processing 519 is F9.5, the aperture playback drive amount in processing 524 is 2.7 steps (9.5−6.8). The equation for calculating the aperture playback drive amount illustrated here provides a calculation using an F-number up to the first decimal place, but it may be acquired by calculation processing with a finer resolution.

Processing 526 to processing 532 are similar to processing 505 to processing 510, and in a case where a request to acquire the diameter information is transmitted from the camera body 200, the intermediate accessory 300 generates current aperture diameter information, responds to the camera body 200 with it, and updates the display of the aperture diameter information on the display unit 206. In processing 533, the intermediate accessory 300 turns off the operation notification lamp 406 which was turned on in processing 520.

The above processing can realize the storage and playback drive of the aperture diameter during imaging.

Example of Still Image Capturing Mode

In processing 540, the "camera initiative" setting is notified as an aperture drive timing setting notification by the camera body 200, and in processing 541, the intermediate accessory 300 stores this setting information.

In processing 542, the accessory microcomputer 301 detects manual aperture operation information similarly to processing 503, but since the "camera initiative" setting has been stored as described above, the accessory aperture unit 303 is not controlled (driven) at this timing. Processing 543 to processing 549 are similar to processing 505 to processing 511 in the description of the moving image mode, and the intermediate accessory 300 generates various diameter information, responds to the camera body 200 with it, and displays it on the display unit 206 as the aperture set value.

In a case where a still image capturing operation for still image capturing is accepted by the operation unit 207 of the camera body 200 in processing 550, an aperture drive command specifying aperture diameter information for still image capturing is transmitted from the camera body 200 in processing 551. At this time, since the lens internal state, such as a zoom position, may have changed since the intermediate accessory 300 acquired the maximum aperture diameter information from the interchangeable lens 100 in processing 544, the current aperture diameter information is acquired again from the interchangeable lens 100 in processing 552 and processing 553.

In processing 554, the accessory microcomputer 301 calculates the aperture adjusting amount to be driven from the maximum aperture diameter acquired in processing 553 for the aperture diameter specified by the camera body in processing 551. In processing 555, the accessory microcomputer 301 drives the accessory aperture unit 303 using the aperture adjusting amount calculated in processing 554. The aperture diameter information when the aperture drive was performed in processing 555 is temporarily stored in processing 556, and a response is transmitted to the camera body 200 in processing 557 to notify the camera body 200 of the aperture drive completion for still image capturing.

In processing 558, the camera body 200 completes the still image capturing operation and performs imaging preview display, allowing the user to confirm the contents of the captured image. For example, during that preview display, the user can operate the aperture diameter storing button 404 illustrated in FIGS. 4A and 4B, and in processing 559, the intermediate accessory 300 detects that user operation. In this embodiment, as an example, the aperture diameter storing button 404 is pressed during the preview display, but this may be done at any timing after a still image is captured.

In processing 560, the accessory microcomputer 301 stores in the accessory memory 321 the aperture diameter information that was temporarily stored in processing 556. In processing 561, the accessory microcomputer 301 turns on the operation notification lamp 406 illustrated in FIGS. 4A and 4B for a predetermined time to indicate that a storing operation has been performed in response to a user request to store the aperture diameter.

Using the above processing, storage of the aperture diameter information at during still image capturing by a user operation is completed. Thereafter, the still image capturing operation may be performed any number of times. Any camera operation may be performed, including power off/on operations, and referring to the following FIG. 5E, a description will be given of still image capturing while the stored diameter is played back only if an aperture diameter playback operation is subsequently performed by the user operation.

In processing 562, the accessory microcomputer 301 detects that the aperture diameter playback button 405 illustrated in FIGS. 4A and 4B has been operated. In processing 563, the accessory microcomputer 301 reads and acquires the manual aperture diameter information stored in processing 560 from the accessory memory 321. Only one piece of manual aperture diameter information may be stored, or a plurality of pieces of manual aperture diameter information may be stored and readable. In processing 564, the accessory microcomputer 301 turns on the operation notification lamp 406 illustrated in FIGS. 4A and 4B.

In processing 565, in a case where a still image capturing operation for still image capturing is accepted by the operation unit 207 of the camera body 200, an aperture drive instruction specifying the aperture diameter information for still image capturing is transmitted from the camera body 200 in processing 566. However, the intermediate accessory 300 drives the accessory aperture unit 303 so as to reproduce the stored diameter (diameter information) as described later. At this time, the intermediate accessory 300 acquires the current maximum aperture diameter information from the interchangeable lens 100 in processing 567 and processing 568.

In processing 569, the accessory microcomputer 301 calculates an aperture adjusting amount to be driven from the maximum aperture diameter acquired in processing 568 for the aperture diameter read out in processing 563. In processing 570, the accessory microcomputer 301 drives the accessory aperture unit 303 for the aperture adjusting amount calculated in processing 569. In processing 571, the intermediate accessory 300 turns off the operation notification lamp 406 that was turned on in processing 564. In processing 572, the intermediate accessory 300 responds to the camera body 200 with the aperture drive completion for still image capturing.

Using the above processing, the aperture diameter that was used for still image capturing is stored, and the accessory aperture unit 303 can be controlled so as to provide the diameter stored in the still image capturing operation when the playback operation is performed. Thereby, the storage and playback drive of the aperture diameter in still image capturing can be realized.

In this embodiment, the aperture diameter can be played back in a case where a still image capturing operation is accepted while pressing of the aperture diameter playback button 405 illustrated in FIGS. 4A and 4B is maintained. Alternatively, the aperture diameter may be played back when the first still image capturing operation is accepted after the aperture diameter playback button 405 is pressed. The user can visually confirm that imaging is performed while the stored aperture diameter is being played back by the lamp display that is turned on in processing 564 and turned off in processing 571.

In this embodiment, the user can perform a storing operation and playback operation of the aperture diameter. In the moving image capturing mode, the aperture diameter can be stored at the timing of the storing operation and played back at the timing of the playback operation. In the still image capturing mode, the aperture diameter during still image capturing is stored just before the timing of the storing operation and the stored aperture diameter can be played back by the still image capturing operation during the playback operation. This configuration can provide storing and playback functions of an aperture diameter suitable for each of moving image capturing and still image capturing.

Although this embodiment provides both a moving image capturing mode and a still image capturing mode, the present disclosure is not limited to this embodiment and may provide only one of them. In this embodiment, in a case where the accessory microcomputer 301 acquires second instruction information, the accessory microcomputer 301 may have at least one of a first storage mode or a second storage mode as a storage mode. In a case where the accessory microcomputer 301 acquires third instruction information, the accessory microcomputer 301 may have at least one of a first playback mode or a second playback mode as a playback mode. The first storage mode is a storage mode for storing diameter information in the accessory memory 321 at a first timing when the second instruction information is acquired. The second storage mode is a storage mode for storing diameter information in the accessory memory 321 at a second timing different from the first timing. The first playback mode is a playback mode for controlling the accessory aperture unit 303 using diameter information at a third timing when the third instruction information is acquired. The second playback mode is a playback mode for controlling the accessory aperture unit 303 using diameter information at a fourth timing different from the third timing.

In a case where both the moving image capturing mode and the still image capturing mode are provided, the accessory microcomputer 301 may determine whether an imaging state of the camera body 200 is a moving image capturing state (moving image capturing mode) or a still image capturing state (still image capturing mode). In a case where the imaging state is the moving image capturing state, the accessory microcomputer 301 sets the storage mode to the first storage mode and the playback mode to the first playback mode, for example. On the other hand, in a case where the imaging state is the still image capturing state, the accessory microcomputer 301 sets the storage mode to the second storage mode and the playback mode to the second playback mode, for example.

In the second storage mode, the accessory microcomputer 301 may store in the accessory memory 321 diameter information for imaging when an imaging instruction is acquired from the camera body 200 via the accessory communication circuit 302.

In the second storage mode, the accessory microcomputer 301 may store in the accessory memory 321 at the first timing, diameter information for imaging when an imaging instruction is acquired from the camera body 200 before the first timing.

In a case where the accessory microcomputer 301 acquires third instruction information at the third timing in the second playback mode and acquires an imaging instruction from the camera body 200 after the third timing, the accessory microcomputer 301 controls the accessory aperture unit 303 using the stored diameter information.

Second Embodiment

A description will now be given of a second embodiment according to the present disclosure. The configuration of a camera system according to this embodiment is similar to that of the first embodiment. The camera system according to this embodiment is different from that of the first embodiment in that it has an intermediate accessory 300a that has an aperture diameter playback button 405 but does not have an aperture diameter storing button 404, instead of the intermediate accessory 300 of the first embodiment.

Figures 6A, 6B:
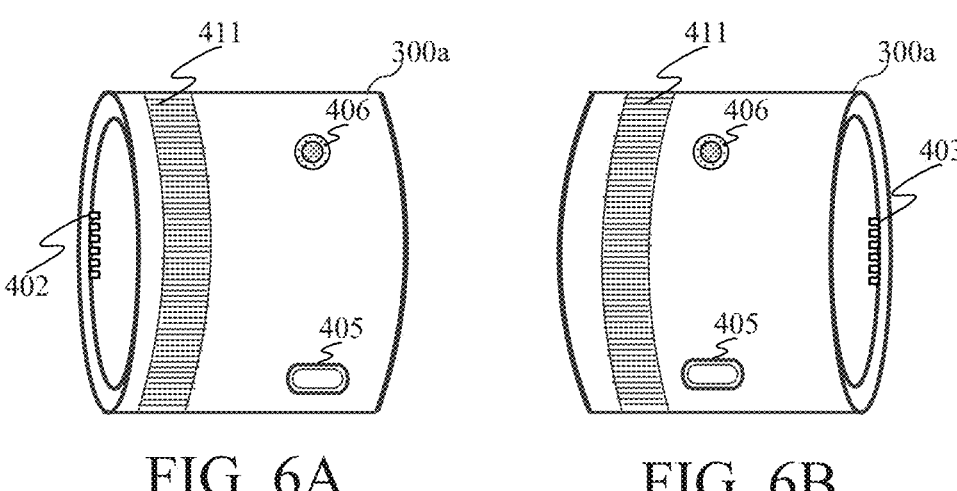
FIGS. 6A and 6B are external views of an intermediate accessory according to a second embodiment.

FIGS. 6A and 6B are external views of the intermediate accessory 300a. The only difference from the first embodiment illustrated in FIGS. 4A and 4B is that it does not have the aperture diameter storing button 404, and the other configurations are the same as those of the first embodiment.

Figure 7A:
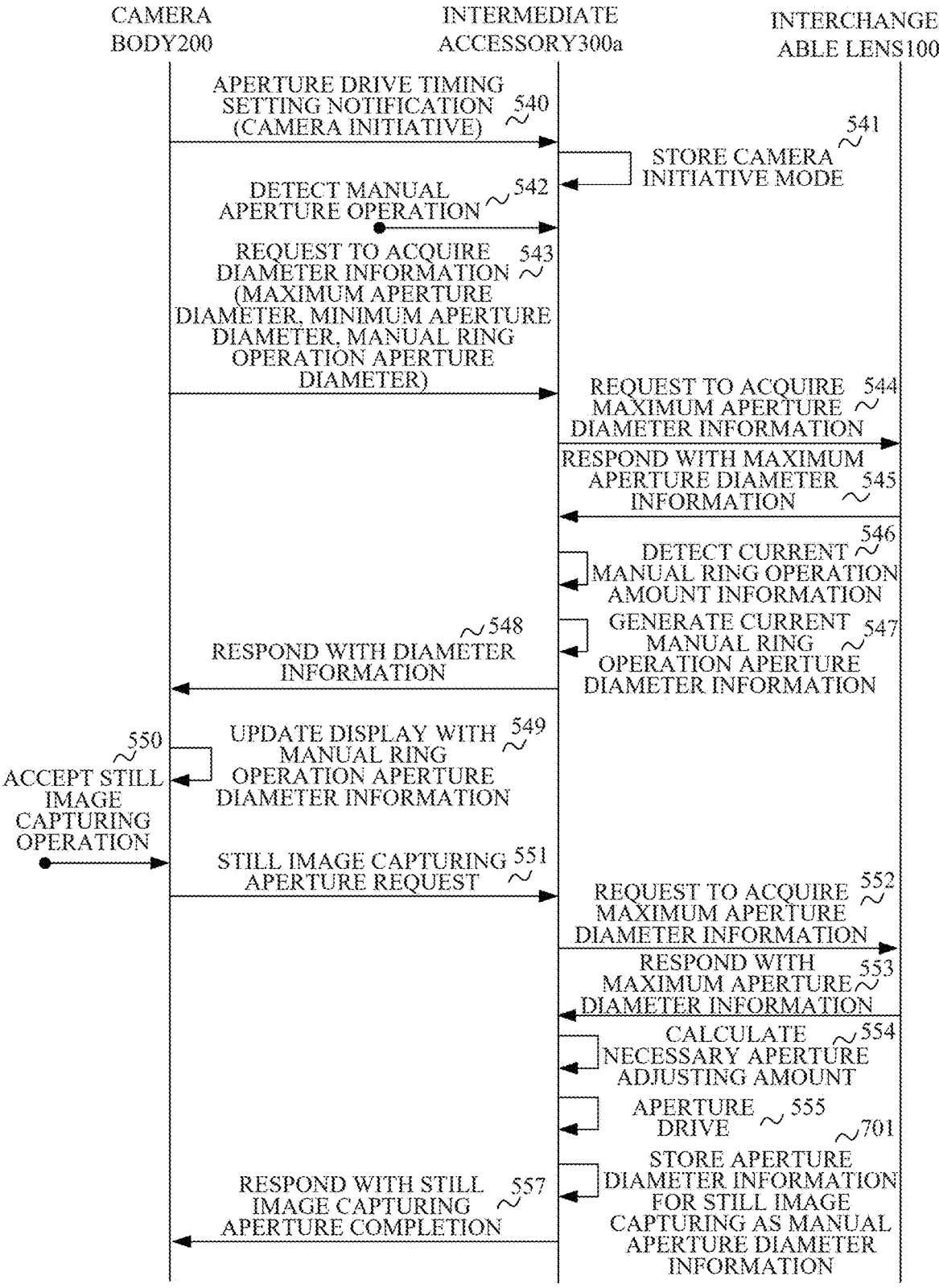
FIG. 7A explains a storing operation of an aperture diameter in a still image capturing mode according to the second embodiment.
Figure 7B:
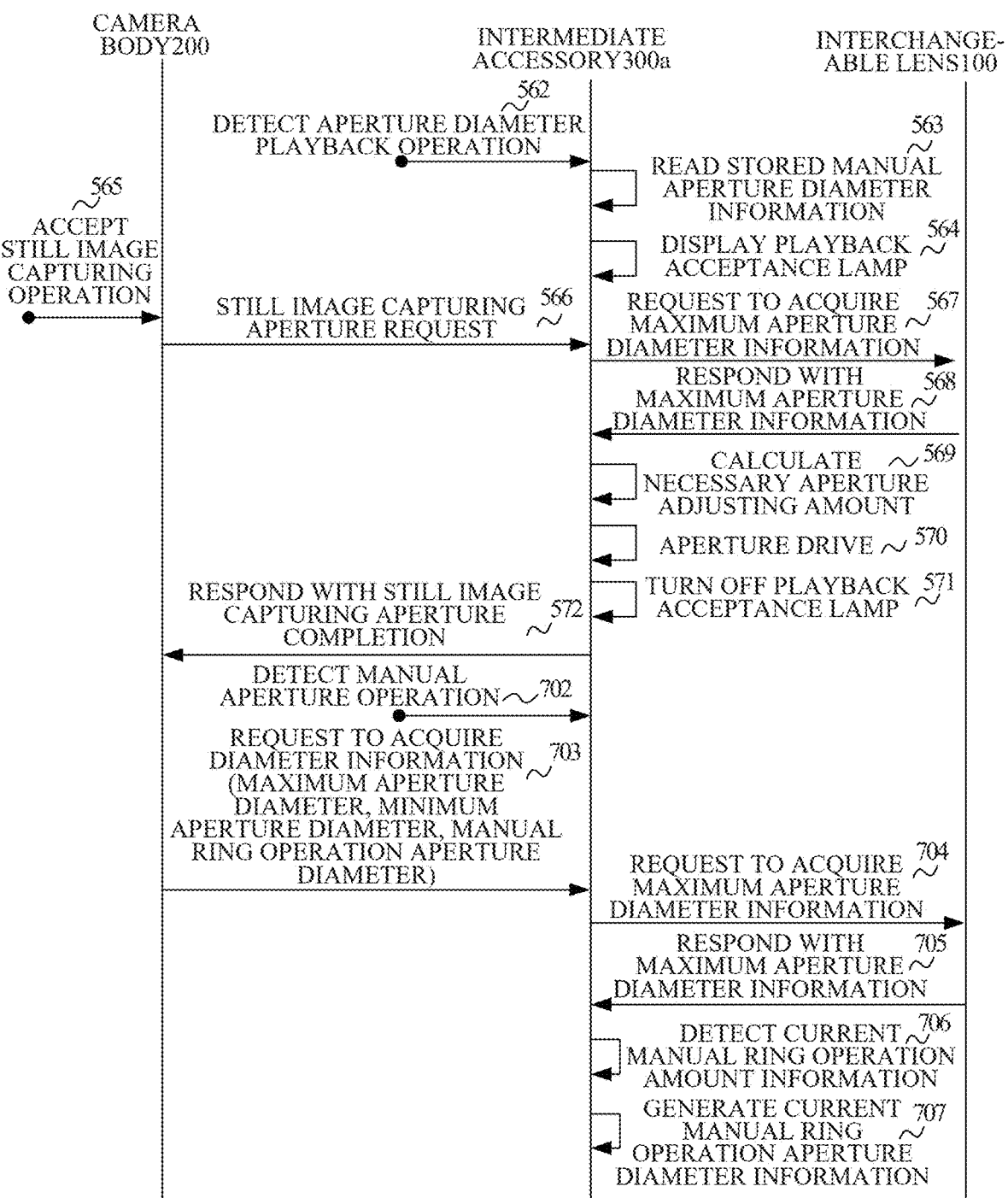
FIGS. 7B and 7C explain a playback operation of the aperture diameter in the still image capturing mode according to the second embodiment.
Figure 7C:
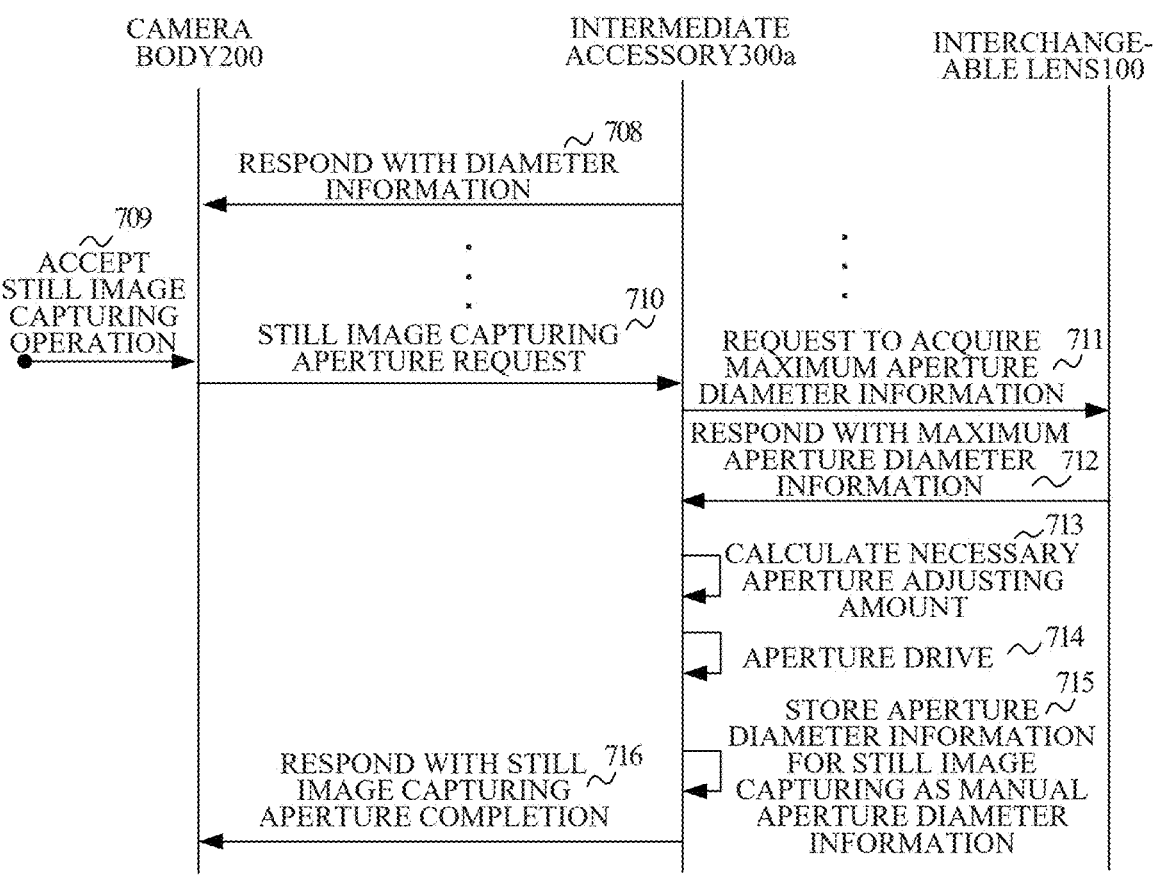

Referring now to FIGS. 7A and 7B, a description will be given of the playback operation of the aperture diameter in the still image capturing mode in a state in which the camera body 200, the interchangeable lens 100, and the intermediate accessory 300a are combined. FIG. 7A explains the storing operation of the aperture diameter in the still image capturing mode. FIGS. 7B and 7C explain the playback operation of the aperture diameter in the still image capturing mode. Processing in FIGS. 7A and 7B, which is corresponding processing in FIGS. 5C and 5D of the first embodiment, will be designated by the same reference numerals.

Processing 540 to processing 555 are similar to those of the first embodiment, and accept a manual aperture operation by the user, display the diameter information on the display unit 206 by that operation, and then accept a still image capturing operation by the user to perform aperture control.

In processing 701, the accessory microcomputer 301 stores in the accessory memory 321 the aperture diameter information of the aperture drive performed for still image capturing in processing 555. A difference from the first embodiment is that the aperture diameter information is stored each time a still image is captured without accepting an aperture diameter storing operation.

Hereinafter, any camera operation other than still image capturing may be performed, including power off/on operations. Only in a case where the aperture diameter playback button 405 is then operated by the user, still image capturing is performed while the stored diameter is played back, as will be described with reference to FIGS. 7B and 7C below.

Processing 562 to processing 572 are similar to those of the first embodiment. In a case where the aperture diameter playback button 405 illustrated in FIGS. 6A and 6B is operated and a still image capturing operation is accepted, the accessory microcomputer 301 drives the accessory aperture unit 303 so as to play back the aperture diameter stored in processing 556, and completes still image capturing. Processing 702 to processing 708 are similar to processing 542 to processing 548, and the aperture diameter information is displayed on the display unit 206 of the camera body 200 by accepting a manual aperture operation by the user.

Thereafter, in a case where a still image capturing operation is performed without operating the aperture diameter playback button 405, processing 709 to processing 716 are performed. This is similar to processing 550 to processing 557, and the accessory microcomputer 301 controls the accessory aperture unit 303 based on the aperture diameter information notified from the camera body 200, and stores that diameter information in the accessory memory 321. That is, in a case where the aperture diameter playback button 405 is pressed to capture a still image as illustrated in processing 562, the aperture diameter in the last still image capturing is played back. On the other hand, in a case where a still image is captured without pressing the aperture diameter playback button 405, the operation is different so that the still image is captured with the diameter information of the current manual aperture, and the aperture diameter at that time is stored.

Due to the above operation, in a case where the aperture diameter playback button 405 is pressed to capture a still image, the accessory aperture unit 303 can be driven to play back the aperture diameter of the last still image capturing.

This embodiment enables the user to perform a playback operation of the aperture diameter, and the operation member includes only the playback button unlike the first embodiment. In the still image capturing mode, a still image capturing function that plays back the aperture diameter during the last imaging can be provided by operating the playback button.

Each embodiment can provide an accessory having an aperture unit, its control method, and a storage medium, each of which can properly store and playback diameter information of the aperture unit.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

This application claims priority to Japanese Patent Application No. 2023-184408, which was filed on Oct. 27, 2023, and which is hereby incorporated by reference herein in its entirety.

What is claimed is:

1. An accessory detachably attached between an interchangeable lens and an image pickup apparatus, the accessory comprising:

an aperture unit configured to adjust a light amount incident from the interchangeable lens;

a communication unit configured to communicate with each of the interchangeable lens and the image pickup apparatus;

a memory storing diameter information of the aperture unit; and a processor configured to:

control the aperture unit using the diameter information, and acquire, through an operation by a user, first instruction information for instructing control of the aperture unit, second instruction information for instructing storage of the diameter information, and third instruction information for instructing playback of the diameter information, wherein the processor has at least one of a first storage mode for storing the diameter information in the memory at a first timing when the second instruction information is acquired in a case where the processor acquires the second instruction information, and a second storage mode for storing the diameter information in the memory at a second timing different from the first timing in a case where the processor acquires the second instruction information, and wherein the processor has at least one of a first playback mode in which the aperture unit is controlled using the diameter information at a third timing when the third instruction information is acquired in a case where the processor acquires the third instruction information, and a second playback mode in which the aperture unit is controlled using the diameter information at a fourth timing different from the third timing in a case where the processor acquires the third instruction information.

2. The accessory according to claim 1, further comprising a first operating member operable by the user, wherein the processor is configured to acquire the first instruction information through the first operating member.

3. The accessory according to claim 1, wherein the processor is configured to acquire the first instruction information from at least one of the interchangeable lens and the image pickup apparatus via the communication unit.

4. The accessory according to claim 1, further comprising a second operating member operable by the user, wherein the processor is configured to acquires the second instruction information through the second operating member.

5. The accessory according to claim 1, wherein the processor is configured to acquire the second instruction information from at least one of the interchangeable lens and the image pickup apparatus via the communication unit.

6. The accessory according to claim 1, further comprising a third operating member operable by the user, wherein the processor is configured to acquire the third instruction information through the third operating member.

7. The accessory according to claim 1, wherein the processor is configured to acquire the third instruction information from at least one of the interchangeable lens and the image pickup apparatus via the communication unit.

8. The accessory according to claim 1, wherein in a case where the processor acquires the second instruction information, the processor has the first storage mode and the second storage mode, and in a case where the processor acquires the third instruction information, the processor has the first playback mode and the second playback mode.

9. The accessory according to claim 8, wherein the processor is configured to determine whether the image pickup apparatus is in a moving image capturing state or a still image capturing state, wherein in a case where the image pickup apparatus is in a moving image capturing state, the processor is configured to set a storage mode to the first storage mode, and wherein in a case where the processor sets a playback mode to the first playback mode and the image pickup apparatus is in a still image capturing state, the processor is configured to set the storage mode to the second storage mode and the playback mode to the second playback mode.

10. The accessory according to claim 8, wherein the processor is configured to store the diameter information for imaging in the memory in a case where the processor acquires an imaging instruction from the image pickup apparatus via the communication unit in the second storage mode.

11. The accessory according to claim 8, wherein the processor is configured to store the diameter information for imaging in the memory at the first timing in the second storage mode in a case where the processor acquires an imaging instruction from the image pickup apparatus before the first timing.

12. The accessory according to claim 8, wherein in a case where the processor in the second playback mode acquires the third instruction information at the third timing and acquires an imaging instruction from the image pickup apparatus after the third timing, the processor is configured to control the aperture unit using the diameter information stored in the memory.

13. The accessory according to claim 1, wherein the diameter information includes information regarding an aperture drive amount of the aperture unit.

14. The accessory according to claim 1, wherein the diameter information includes diameter information of the interchangeable lens in a maximum aperture state.

15. A method for controlling an accessory detachably mounted between an interchangeable lens and an image pickup apparatus, the method comprising the steps of:

acquiring, through an operation by a user, first instruction information for instructing control of an aperture unit of the accessory, second instruction information for instructing storage of the diameter information, and third instruction information for instructing playback of the diameter information;

setting, as a storage mode when the second instruction information is acquired, a first storage mode for storing the diameter information in a memory at a first timing when the second instruction information is acquired, or a second storage mode for storing the diameter information in the memory at a second timing different from the first timing; and setting, as a playback mode when the third instruction information is acquired, a first playback mode in which the aperture unit is controlled using the diameter information at a third timing when the third instruction information is acquired, or a second playback mode in which the aperture unit is controlled using the diameter information at a fourth timing different from the third timing.

16. A non-transitory computer-readable storage medium storing a program for causing a computer to execute the method according to claim 15.

* * * * *